D. W SHARES.
Cane-Stripper.

No. 57,979.

2 Sheets—Sheet 1.

Patented Sept. 11, 1866.

D. W SHARES.
Cane-Stripper.
No. 57,979.
2 Sheets—Sheet 2.
Patented Sept. 11, 1866.
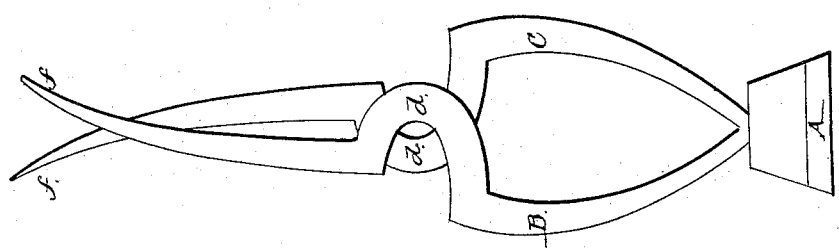
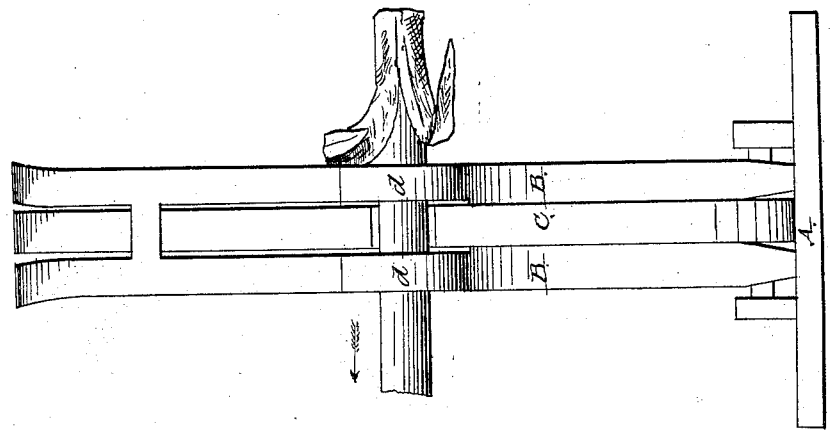
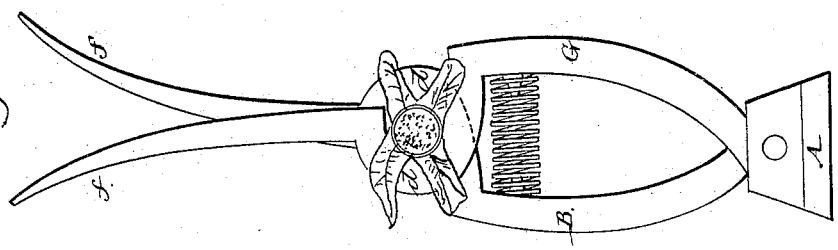

UNITED STATES PATENT OFFICE.

DANIEL W. SHARES, OF HAMDEN, CONNECTICUT.

IMPROVEMENT IN SORGHUM-STRIPPERS.

Specification forming part of Letters Patent No. 57,979, dated September 11, 1866.

*To all whom it may concern:*

Be it known that I, DANIEL W. SHARES, of Hamden, in the county of New Haven and State of Connecticut, have invented a new Improvement in Sorghum-Strippers; and I do hereby declare the following, when taken in connection with the accompanying drawings and the letters of reference marked thereon, to be a full, clear, and exact description of the same, and which said drawings constitute part of this specification, and represent, in—

Figure 3:
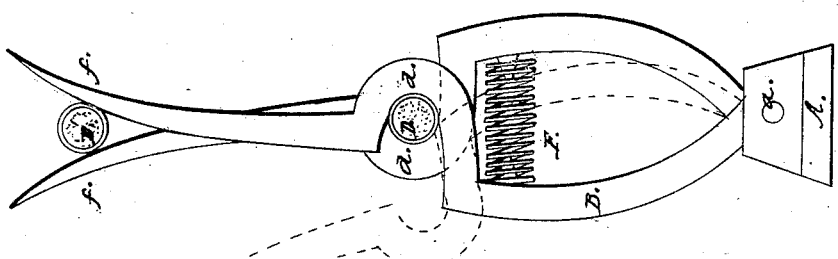
Figure 2:
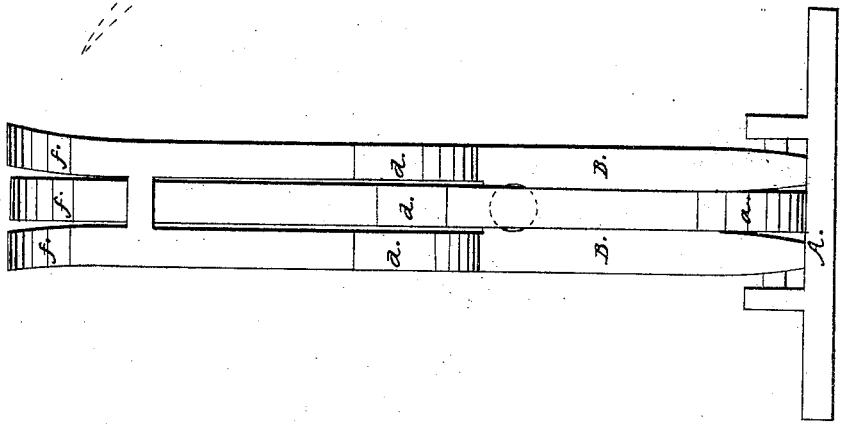
Figure 1:
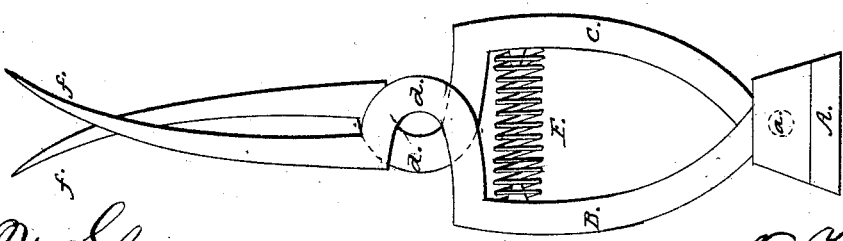

Figure 1, an end view in the position when not in use; Fig. 2, a side view of the same; Fig. 3, an end view as open for use. Figs. 4 and 5 illustrate the stripper as in use; and in Fig. 6, a different arrangement of the spring for closing the jaws.

My invention is designed for stripping sorghum, sugar-cane, or for similar purposes; and it consists in the arrangement of jaws self-adjusting by means of a spring, through which the cane is drawn, and in so drawing the leaves are stripped therefrom.

To enable others to construct and use my improvement, I will proceed to describe the same as illustrated in the accompanying drawings.

A is a plate constructed so as to be secured in any convenient position for the purpose required.

B B are two jaws fixed to the plate A, and curved, as seen in Figs. 1 and 3; C, a single similarly-formed jaw hinged between the two jaws B at *a*, the curvature of each at *d* being of such form that when the cane is inserted it will close upon the cane D, as seen in Fig. 3. A spiral or other spring, E, forces the jaws together, as seen in Fig. 1. The upper ends, *f*, of the jaws are curved, so that by pressing upon the cane when in the position as denoted at D', Fig. 3, the jaws will be open, as denoted in red, Fig. 3, and permit the cane to pass down between the curved parts *d*, and when in that position the spring E closes the jaws around the cane, as seen in Figs. 4 and 5, and when in this position the cane is drawn through and the leaves stripped therefrom, as denoted in Figs. 4 and 5.

I construct the jaws thus formed from malleable iron, which enables me to produce the strippers at a comparatively small cost; yet, if preferred, the jaws may be made of steel and in themselves sufficiently elastic to dispense with the spring E. This construction is shown in Fig. 6.

I prefer to employ two jaws upon one side of the cane and one upon the other, as illustrated; yet a single jaw upon each side is all that is required for the successful working of my stripper.

Having therefore thus fully described my invention, what I claim as new and useful, and desire to secure by Letters Patent, is—

The combination of jaws B and C, constructed and arranged so as to operate substantially in the manner and for the purpose herein set forth.

D. W. SHARES.

Witnesses:
JOHN E. EARLE,
ALTSIE I. TIBBITS.